(No Model.)
J. R. FRY, Jr.
FORK FOR HAY TEDDERS.
No. 292,425.  Patented Jan. 22, 1884.
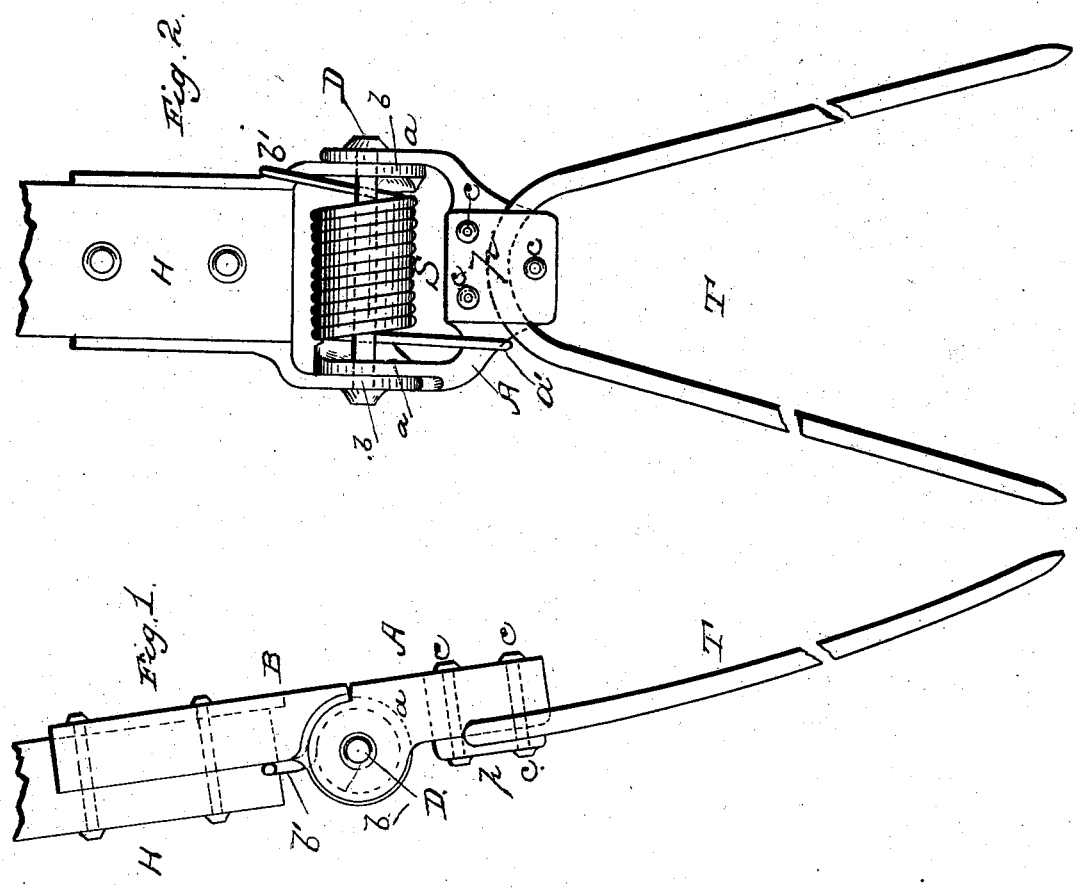
Witnesses.
O. B. Hillyard.
J. J. Freehy.
Inventor
J. R. Fry, Jr.
by Audimon & Smith
Attorneys.

UNITED STATES PATENT OFFICE.

JACOB R. FRY, JR., OF SPRINGFIELD, OHIO.

FORK FOR HAY-TEDDERS.

SPECIFICATION forming part of Letters Patent No. 292,425, dated January 22, 1884.

Application filed October 9, 1883. (No model.)

*To all whom it may concern:*

Be it known that I, JACOB R. FRY, Jr., a citizen of the United States, residing at Springfield, in the county of Clark and State of Ohio, have invented certain new and useful Improvements in Forks for Hay-Tedders; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a side view, and Fig. 2 is a rear view, of my improvement.

This invention has relation to forks for hay-tedders; and it consists in the construction and novel arrangement of devices, as will be hereinafter fully described, and particularly pointed out in the claims appended.

Referring by letter to the accompanying drawings, H designates the arm, which is connected at its upper end to the crank of the machine which vibrates it. To the lower end of the arm H, and on its front face, is bolted the upper leaf, B, of a hinge-joint, the lower leaf or portion, A, of which carries the tines T of the fork. The lugs $a$ of the portion A of the hinge-joint alternate with the lugs $b$ of the portion B of the joint, and a spiral spring, S, is inserted in the space between the lugs, and a bolt, D, is passed through the aligned openings in the lugs $a$ and $b$ and through the spring S. The ends of the outer coils of the spring S are extended in opposite directions, one end, $b'$, resting against the portion B, and the other end, $a'$, resting against the portion A of the hinge, as shown in the drawings. The tines T of the fork are made in one piece, bent on a curve at the middle and diverging from the bend downwardly, each tine being slightly curved, to extend the point of the tine forward, as shown. The bend of the tine is clamped in a recess in the face of the lower portion, A, by a plate, $p$, and three bolts, $c\ c$ $c$, arranged so that two of them pass through the plate $p$ and portion A above the bend and one below the bend, as shown, thus firmly securing the tines in place.

The object of the hinge-joint is to permit the fork to yield when it strikes a stone or stump or other obstruction and be carried back, thereby preventing breakage of the fork. After the obstruction has been passed, the spring S will instantly return the fork to the working position.

By this construction I am enabled to produce a cheap, durable, and convenient fork for hay-tedders, and one that is not liable to become broken or get out of order.

Having thus fully described my invention, what I claim as new, and desire to secure by Letters Patent, is—

1. In a fork for hay-tedders, the combination, with the arm provided with the hinge portion B, having lugs $b$, and the hinge portion A, having lugs $a$, alternating with the lugs $b$, of the spiral spring S, having oppositely-extended ends $a'\ b'$, and the bolt D, passed through the aligned lugs and the spring S, substantially as specified.

2. In a fork for hay-tedders, the combination, with the tines T, made of a single piece of material bent as shown and described, of the recessed hinge portion A, the clamping-plate $p$, and the three bolts $c\ c\ c$, arranged in triangular form, two above and one below the bend of the tine-piece, substantially as specified.

In testimony whereof I affix my signature in presence of two witnesses.

JACOB R. FRY, JR.

Witnesses:
   H. S. SHOWERS,
   WM. A. FRY.